United States Patent
Owens, Jr. et al.

(10) Patent No.: US 6,570,656 B1
(45) Date of Patent: May 27, 2003

(54) ILLUMINATION FLUENCE REGULATION SYSTEM AND METHOD FOR USE IN THERMAL PROCESSING EMPLOYED IN THE FABRICATION OF REDUCED-DIMENSION INTEGRATED CIRCUITS

(75) Inventors: James B. Owens, Jr., San Jose, CA (US); Somit Talwar, Bonita, CA (US); Andrew M. Hawryluk, Los Altos Hills, CA (US); Yun Wang, San Jose, CA (US)

(73) Assignee: Ultratech Stepper, Inc., San Jose, CA (US)

( * ) Notice: Subject to any disclaimer, the term of this patent is extended or adjusted under 35 U.S.C. 154(b) by 0 days.

(21) Appl. No.: 09/546,114

(22) Filed: Apr. 10, 2000

(51) Int. Cl.[7] .......................... G03G 15/08; G01N 21/00
(52) U.S. Cl. ........................................ 356/445; 356/446
(58) Field of Search ................................. 356/445, 446, 356/432, 438, 237.2, 237.3, 237.4, 237.5

(56) References Cited

U.S. PATENT DOCUMENTS

| | | | |
|---|---|---|---|
| 3,591,291 A | 7/1971 | Greer et al. | 356/120 |
| 4,511,800 A | 4/1985 | Harbeke et al. | 250/372 |
| 4,945,254 A * | 7/1990 | Robbins | 250/559.09 |
| 5,208,643 A * | 5/1993 | Fair | 118/666 |
| 5,222,072 A | 6/1993 | Oku | 372/31 |
| 5,726,961 A | 3/1998 | Yanagawa | 369/44.31 |
| 5,908,307 A | 6/1999 | Talwar et al. | 438/199 |
| 5,956,603 A | 9/1999 | Talwar et al. | 438/520 |

* cited by examiner

Primary Examiner—Georgia Epps
Assistant Examiner—Mohammad Abutayeh
(74) Attorney, Agent, or Firm—Allston L. Jones

(57) ABSTRACT

The closed loop embodiment includes a pulsed laser controller to selectively operate a pulsed laser in a lower-power probe mode or a higher power operational mode. In lower-power probe mode, values of $e_T$ (total radiation energy flooding ICs on a silicon wafer), $e_r$ (fraction of $e_T$ specularly reflected), $e_s$ (fraction of $e_T$ scattered) and $e_s$ (fraction of $e_T$ transmitted through wafer) are obtained. A value for $e_a$ (fraction of $e_T$ absorbed wafer) is calculated i.e. $e_a = e_T - (e_r + e_s + e_t)$, and $e_a$ used by pulsed laser controller with pulsed laser in higher power operational mode to adjust pulsed laser fluence over the duration of a pulse to provide flooding radiation energy sufficient to melt an amorphized silicon surface layer beneath radiation-absorbent material, yet insufficient to melt crystalline silicon or ablate radiation-absorbent material. Open loop embodiment substitutes a separate low-power probe laser for operation in lower-power probe mode.

17 Claims, 4 Drawing Sheets

ILLUMINATION FLUENCE REGULATION SYSTEM AND METHOD FOR USE IN THERMAL PROCESSING EMPLOYED IN THE FABRICATION OF REDUCED-DIMENSION INTEGRATED CIRCUITS

BACKGROUND OF THE INVENTION

1. Field of the Invention

This invention relates to the use of thermal processing in the fabrication of integrated circuits (IC) and, more particularly, laser thermal processing (LTP) in the fabrication of many ICs on a silicon wafer, wherein each IC may comprise a plurality of metal oxide semiconductor field-effect transistors (MOSFETs) employing shallow junction formation.

2. Description of the Prior Art

Incorporated by reference herein is U.S. Pat. No. 5,956,603, which issued Sep. 21, 1999 and is assigned to the i ee of the present application. This patent teaches a method for fabricating a plurality of shallow-junction metal oxide semiconductor field-effect transistors (MOSFETs) on a given area of a silicon wafer, in the case in which the MOSFETs are spaced from one another by substantially transparent isolation elements. The method includes an LTP step of flooding the entire given area with laser radiation that is intended to effect the heating to a desired threshold temperature of only the given depth of a surface layer of silicon that has been previously amorphized to this given depth and then doped. This threshold temperature is sufficient to melt amorphized silicon but is insufficient to melt crystalline silicon. However, should the laser radiation be directly incident on both the substantially transparent isolation elements and the silicon surface, a variable portion of the energy of the incident radiation traveling through the substantially transparent isolation elements would be transferred to the silicon surfaces in contact with the isolation elements depending on the depth of the isolation elements thereby causing unpredictable additional heating of the silicon which would result in an unwanted shift in the fluence required to reach the melt threshold temperature in those silicon regions which reach the melt threshold temperature. To prevent this, a top layer stack of a dielectric and a highly radiation-absorbent material (e.g., a 5–50 nm range of a silicon dioxide thin-film under a layer covered by a 20–100 nm range of tantalum nitride thin-film top layer) is deposited over the given area prior to the flooding of the entire given area with laser radiation taking place. After, the melted silicon has cooled and recrystallized, the top layer of highly radiation-absorbent material is stripped.

The total area of the silicon wafer is much larger than the given area occupied by a single IC, wherein a single IC may be composed of the aforesaid plurality of shallow-junction MOSFETs. This permits many ICs to be fabricated on the same silicon wafer. Each of these many ICs being fabricated is successively flooded, in turn, with laser radiation over its entire given area. However, due to (1) the technique employed to deposit the radiation-absorbent material, (2) thin film interference and/or (3) surface roughness of the film, the laser-radiation energy absorbed by the surface layers over the entire given area of an IC varies from successively-flooded IC to IC of the many ICs being fabricated. This variation in energy absorption results in a problem of either the energy absorption being so high as to cause undesired ablation of the surface layers or melting of crystalline silicon of some of the ICs being fabricated due to overheating or, alternatively, or undesired no melting of the surface layers and/or activation at the source and drain regions of others of the ICs being fabricated due to under heating.

The present invention is directed to a solution to this problem.

SUMMARY OF THE INVENTION

Broadly, the present invention is directed to deriving an output $e_a$ indicative of the fraction of the radiation energy flooding a given surface area a silicon wafer which is absorbed by the silicon wafer in accordance with the equation $e_a = e_T - (e_r + e_s + e_t)$, where $e_T$ is a measured total value of the flooding radiation energy which is insufficient to damage or significantly heat the silicon wafer, $e_r$ is the measured value of the fraction the flooding radiation energy which is specularly reflected from the given surface area, $e_s$ is the measured value of any non-negligible fraction of the flooding radiation energy which is scattered by the given surface area and $e_t$ is the measured value of any non-negligible fraction of the flooding radiation energy which is transmitted through the wafer. More specifically, the present invention is directed to the thermal-processing fabrication of a shallow-junction of an IC occupying the given surface area on the silicon wafer, and the wafer comprises crystalline silicon having an overlying surface layer of amorphized silicon covered by radiation-absorbent material. In this case, the flooding radiation energy has given spectral characteristics and the output $e_a$ is subsequently employed for a given time duration to adjust the fluence value of an illumination source, that has spectral characteristics similar to the given spectral characteristics and emits second radiation energy flooding the given surface area with a fluence value sufficiently high to result in the second radiation energy effecting the melting of the amorphized silicon but not high enough to result in the second radiation energy effecting either the melting of the crystalline silicon or the ablation of the radiation-absorbent material.

DESCRIPTION OF THE PREFERRED EMBODIMENT

Figure 1:
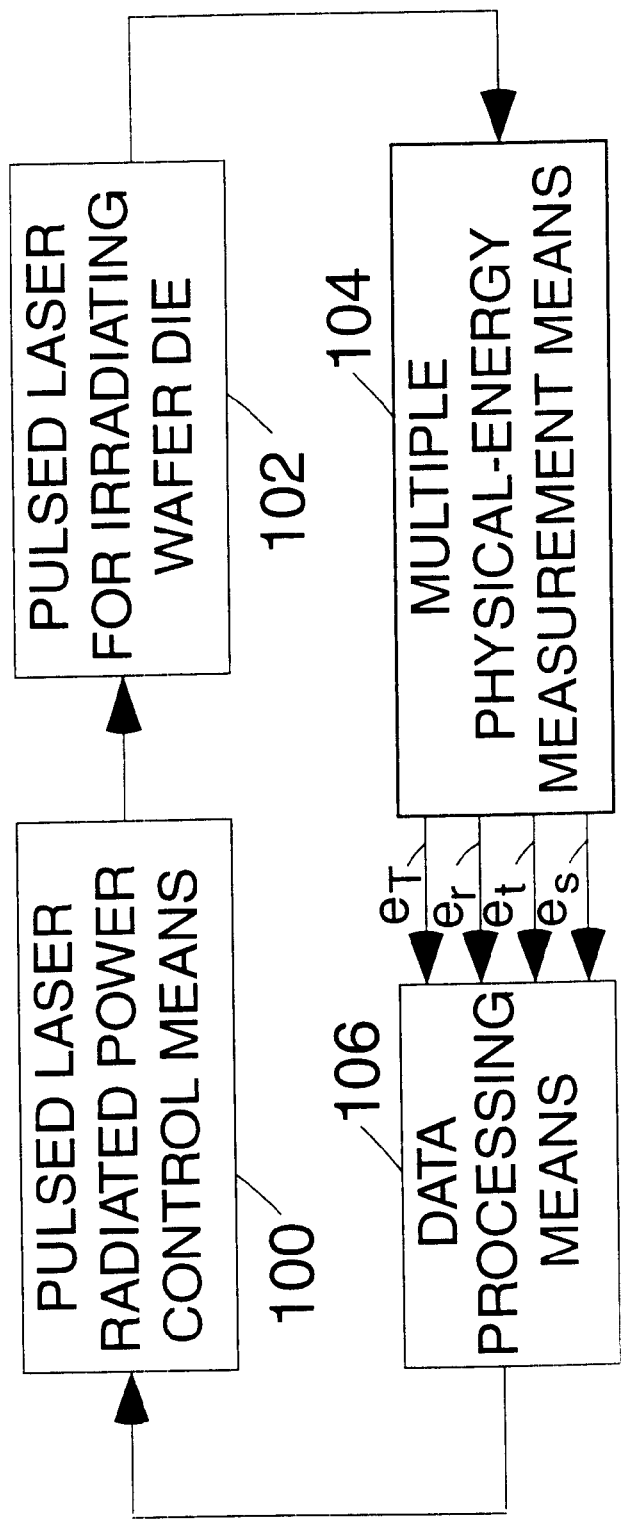
FIG. 1 is a functional block diagram of a closed loop that constitutes a preferred embodiment of a laser fluence regulation system for use in laser thermal processing.

Referring to the laser fluence regulation system shown in FIG. 1, there is shown a closed loop comprising pulsed laser radiated power control means 100, pulsed laser for irradiating wafer die 102 (where a wafer die corresponds in area to the given flooded area occupied on the wafer surface by any single one of the successively-flooded many ICs being fabricated), multiple physical-energy measurement means 104 (shown in detail in FIG. 1a described below) and data processing means 106. In the following detailed description of FIG. 1, it is assumed, for illustrative purposes, that pulsed laser 102 comprises a pulsed XeCl excimer laser generating a 20 nanosecond (ns) pulse of radiation having a wavelength of 308 nm. However, it should be understood that it is within the contemplation of the present invention to employ another type of laser (such as a laser operating, for example, at any one of 151, 193, 248, 351, 355, 375, 532, 750, and 1064 nm wavelengths).

Pulsed laser radiated power control means 100, which has its output applied as an input to pulsed laser for irradiating wafer die 102, is capable of (1) operating pulsed laser 102 in either a low-power probe mode or, alternatively, in a high-power operational mode, and (2) controlling the output fluence of pulsed laser 102 when operating in its high-power operational mode in accordance with data supplied as an input to control means 100 from data processing means 106. Normally, each high-power operational mode operation of pulsed laser 102 is immediately preceded by a low-power probe mode operation. When pulsed laser 102 is operated in its low-power probe mode, multiple physical-energy measurement means 104 is effective in separately deriving an $e_T$ output (having a measured value corresponding substantially to the total energy in a probe-mode radiated pulse), an $e_r$ output (having a measured value corresponding substantially to the portion of this total probe-mode radiated pulse energy that is reflected from the wafer surface), an $e_t$ output (having a measured value corresponding substantially to the portion of this total probe-mode radiated pulse energy that is transmitted through the wafer surface), and an $e_s$ output (having a measured value corresponding substantially to the portion of this total probe-mode radiated pulse energy that is scattered from the wafer surface). These respective measured values $e_T$, $e_r$, $e_t$ and $e_s$ are applied as separate inputs to data processing means 106 (which is preferably a digital data processing means incorporating an analog-to-digital (A/D) converter for converting $e_T$, $e_r$, $e_t$ and $e_s$ in analog form to digital form). Data processing means 106 is capable of employing the values $e_T$, $e_r$, $e_t$ and $e_s$ to compute the portion of total probe-mode radiated pulse energy $e_a$ that corresponds to the absorbable energy under the prevailing energy absorption conditions of the wafer surface occupied by that particular one of the IC dies to be successively-flooded which is then being operated on, since $e_a$ corresponds to the difference between the total probe-mode radiated pulse energy $e_T$ and the sum of the reflected portion $e_r$, transmitted portion $e_t$ and scattered portion $e_s$ (i.e., $e_a = e_T - [e_r + e_t + e_s]$). The output from data processing means 106, which is indicative of the computed value $e_a$ and is applied as an input to input to control means 100, permits control means to adjust the fluence of the radiation to be emitted by pulsed laser 102 in its immediately subsequent high-power operational mode to heat the given surface area of the amorphized silicon of that IC die to a value which is sufficient to cause melting of the amorphized silicon, but is insufficient to cause melting of the underlying crystalline silicon or ablation of the overlying highly radiation-absorbent material. Preferably, the output from data processing means 106, and the resulting adjustment in the fluence of by pulsed laser 102, is determined by the difference between the computed value of $e_a$ for the current IC die being operated on and the computed value of $e_a$ for the immediately preceding IC die that has already been operated on, rather than by the computed value of $e_a$ of just the current IC die.

Figure 1A:
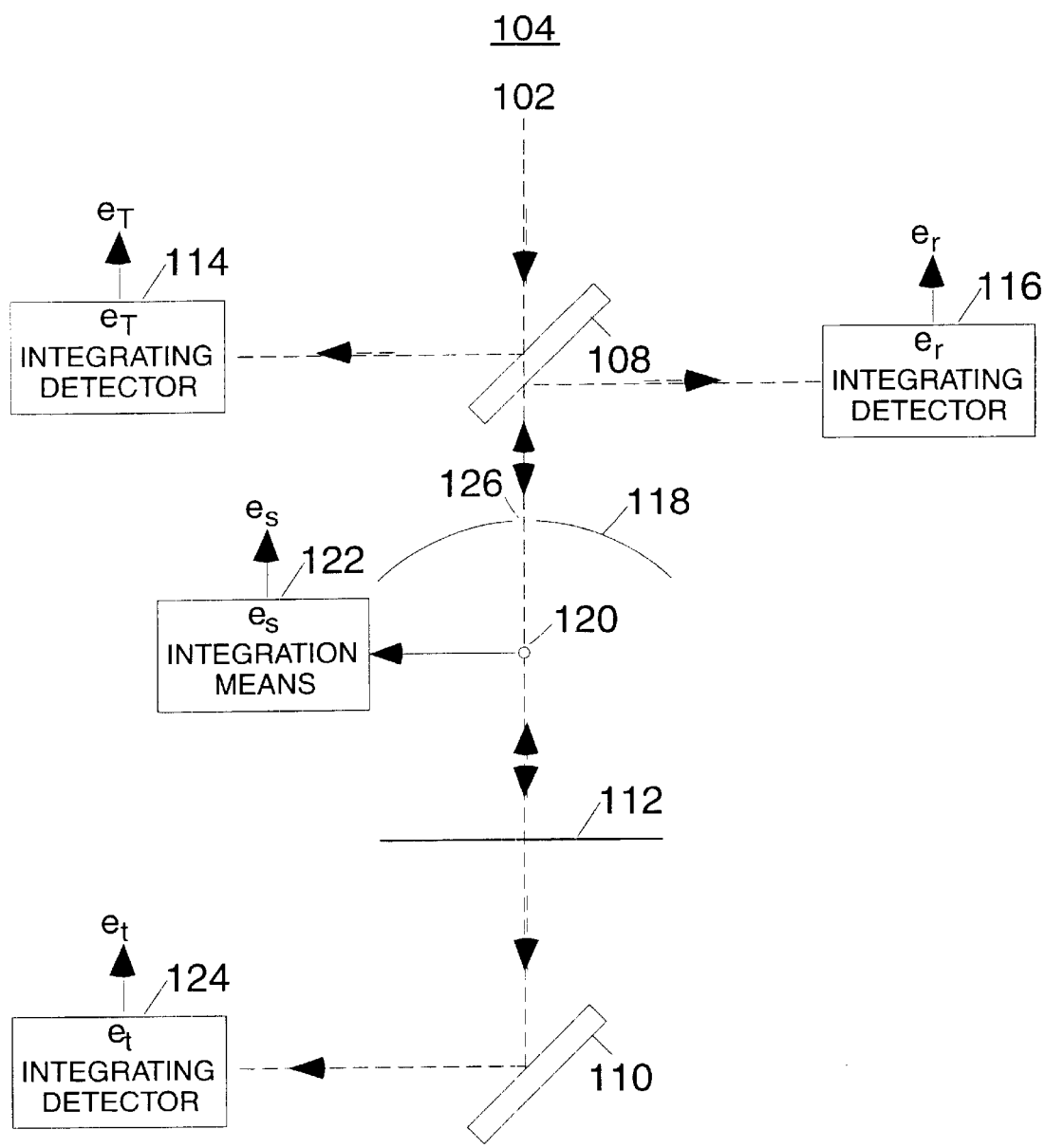
FIG. 1a is a schematic diagram of the multiple physical-energy measurement means of FIG. 1.

Reference is now made to FIG. 1a, which schematically shows the structure of multiple physical-energy measurement means 104 in more detail. This structure comprises partially-reflecting mirror 108, mirror 110 (which is preferably fully reflective), wafer 112, $e_T$ integrating detector 114, $e_r$ integrating detector 116, scattered-radiation reflector dome 118, radiation-to-electric transducer 120, $e_s$ integrating means 122 and $e_t$ integrating detector 124. Partially-reflecting mirror 108 includes partially-reflecting top and bottom surfaces, each of which reflects only a predetermined minor fraction of radiation incident thereon. Thus, the remaining major fraction of radiation incident on each of these surfaces of mirror 108 is transmitted therethrough. As indicated in FIG. 1a, radiation emitted from pulsed laser 102 is incident on the top surface of mirror 108, resulting in the reflected predetermined minor fraction of radiation therefrom being received by $e_T$ integrating detector 114. Detector 114, which comprises a structure including a radiation-to-electric transducer responsive to this received radiation for deriving an electrical signal which is then integrated over the duration of a pulse. This structure results in an $e_T$ output from detector 114 having a value which is proportional to (and, therefore monitors) the total energy contained in the emitted pulse from pulsed laser 102.

The non-reflected major fraction of the radiation incident on mirror 108, which is transmitted therethrough, passes through an opening 126 in dome 118 and then floods the given surface area of wafer 112 occupied by the single IC die then being operated on. The $e_r$ integrating detector 116 receives any of this flooding radiation which is specularly reflected from this given surface area that travels back through opening 126 in dome 118 and is reflected from the bottom surface of mirror 108. The $e_r$ integrating detector 116 (which has a structure similar to $e_T$ integrating detector 114) derives an $e_r$ output from detector 116 having a value which is proportional to the specularly reflected energy resulting from the radiation flooding this given surface area.

Ideally, the given surface area of each of the IC dies, which are successively-flooded with incident radiation, should be perfectly smooth. However, the fact is that, in practice, such given surface areas are likely to be somewhat rough and the degree of such roughness varies from IC die to IC die. Except in the case where this roughness is negligible, it will cause significant scattering (i.e., non-specular reflection) of some of the radiation incident on the IC die that is then being currently flooded. Substantially all of such scattered radiation is collected by the reflecting surface of dome 118 and focused on radiation-to-electric transducer 120. The electric output of radiation-to-electric transducer 120 is applied as an input to $e_s$ integrating means 122. Radiation-to-electric transducer 120 and $e_s$ integrating means 122 together form the structure of an $e_s$ integrating detector for deriving an $e_s$ output from $e_s$ integrating means 122.

The fraction, f, of the energy in the radiation pulse incident on the flooded given surface area of the IC die currently being operated on that is absorbed by the partial absorber layers (which comprise the stack of a dielectric and the highly radiation-absorbent material together with the amorphized silicon layer) of that IC die is given by $f = 1 - \exp(-th/l_a)$, where $l_a$ is the laser absorption length, and th is the thickness of the partial absorber. The value of $l_a$ is equal to $\lambda/4$ nk, where $\lambda$ is the laser wavelength and k is the extinction coefficient. If the thickness, th, of the absorber layers is greater than or equal to $3l_a$, there will be negligible radiation transmitted through wafer 112. If this be the case, both mirror 110 and $e_t$ integrating detector 124 may be dispensed with. However, assuming the thickness, th, of the absorber layers is smaller than $3l_a$, a non-negligible amount of radiation will be transmitted through wafer 112 and then, after being reflected from the surface of mirror 110, applied as an input to $e_t$ integrating detector 124. This results in $e_t$ integrating detector 124 deriving an $e_t$ output from detector 124 having a value which is proportional to the energy transmitted through wafer 112 that results from the radiation pulse incident on the flooded given surface area of the IC die currently being operated on.

When pulsed laser 102 is operated in its low-power probe mode, the energy of the probe radiation must be low enough that there will be no damage and significant heating to wafer 112. However, the energy of the probe radiation has to be, at the very least, high enough for the reflected radiation energy to be detected by $e_r$ integrating detector 116 in the special case where each of the transmitted and scattered radiation energies are considered to be insignificant. However, in the general case, where all of the reflected, transmitted and scattered radiation energies are considered to be significant, the energy of the probe radiation has to be high enough for all of these radiation energies to be detected by $e_r$ integrating detector 116, $e_t$ integrating detector 124 and the $e_s$ integrating detector formed by radiation-to-electric transducer 120 and $e_s$ integrating means 122.

Whenever pulsed laser 102 is being operated in its high-power operational mode, the respective $e_r$, $e_t$ and $e_s$ outputs from multiple physical-energy measurement means 104 are not used to effect a change in the fluence of pulsed laser 102 from that already determined by the immediately preceding low-power probe mode operation of pulsed laser 102.

The above-described closed-loop laser fluence regulation system shown in FIGS. 1 and 1a is considered to be the preferred embodiment of the present invention. However, the present invention also includes the open-loop laser fluence regulation system shown in FIGS. 2 and 2a as an alternative embodiment thereof. More specifically, the closed-loop laser fluence regulation system shown in FIG. 2 comprises laser radiated power control means 200, pulsed laser for irradiating wafer die 202, probe laser for irradiating wafer die 203 (which is structurally and functionally separate from pulsed laser 202), multiple physical-energy measurement means 204 (shown in detail in FIG. 2a described below) and data processing means 206. The functions performed by multiple physical-energy measurement means 204 and data processing means 206 correspond, respectively, to above-described multiple physical-energy measurement means 104 and data processing means 106 of FIG. 1. However, pulsed laser radiated power control means 200, which has its output applied as an input to pulsed laser for irradiating wafer die 202, is capable of operating pulsed laser 202 only in a high-power operational mode, with the output fluence of pulsed laser 202 being controlled in accordance with data supplied as an input to control means 200 from data processing means 206. Normally, each high-power operational mode operation of pulsed laser 202 is immediately preceded by a low-power probe mode operation of probe laser 203, wherein physical-energy measurement means 204 is effective in separately deriving respective measured values $e_T$, $e_r$, $e_t$ and $e_s$ are applied as separate inputs to data processing means 206.

Probe laser 203 may be a different type of laser (e.g., a neodymium YAG laser, for example) which has substantially similar spectral characteristics as pulsed laser 202 (e.g., an XCl excimer laser, for example), rather than being the same type of laser as pulsed laser 202.

Figure 2:
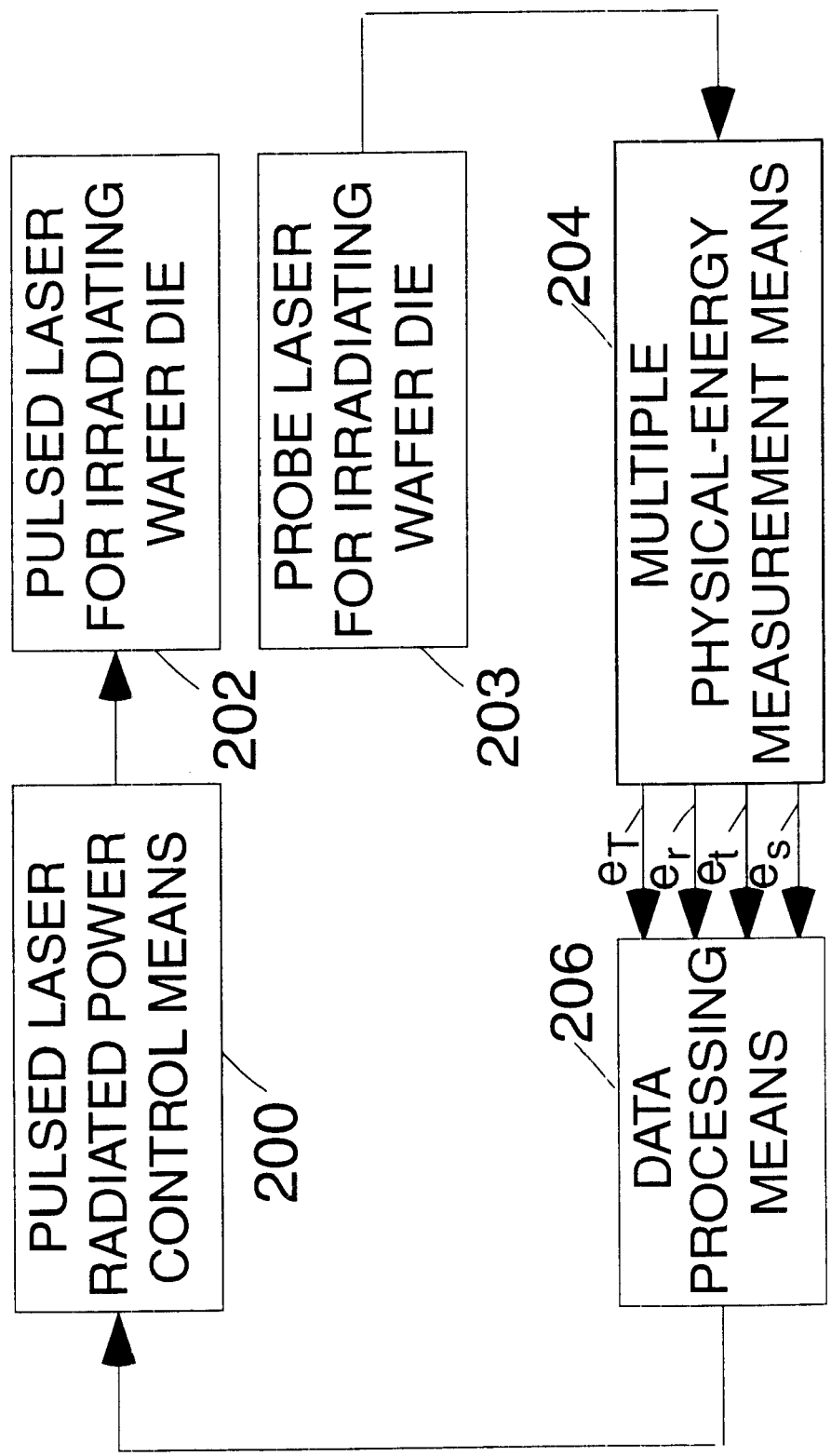
FIG. 2 is a functional block diagram of an open loop that constitutes an alternative embodiment of a laser fluence regulation system for use in laser thermal processing.
Figure 2A:
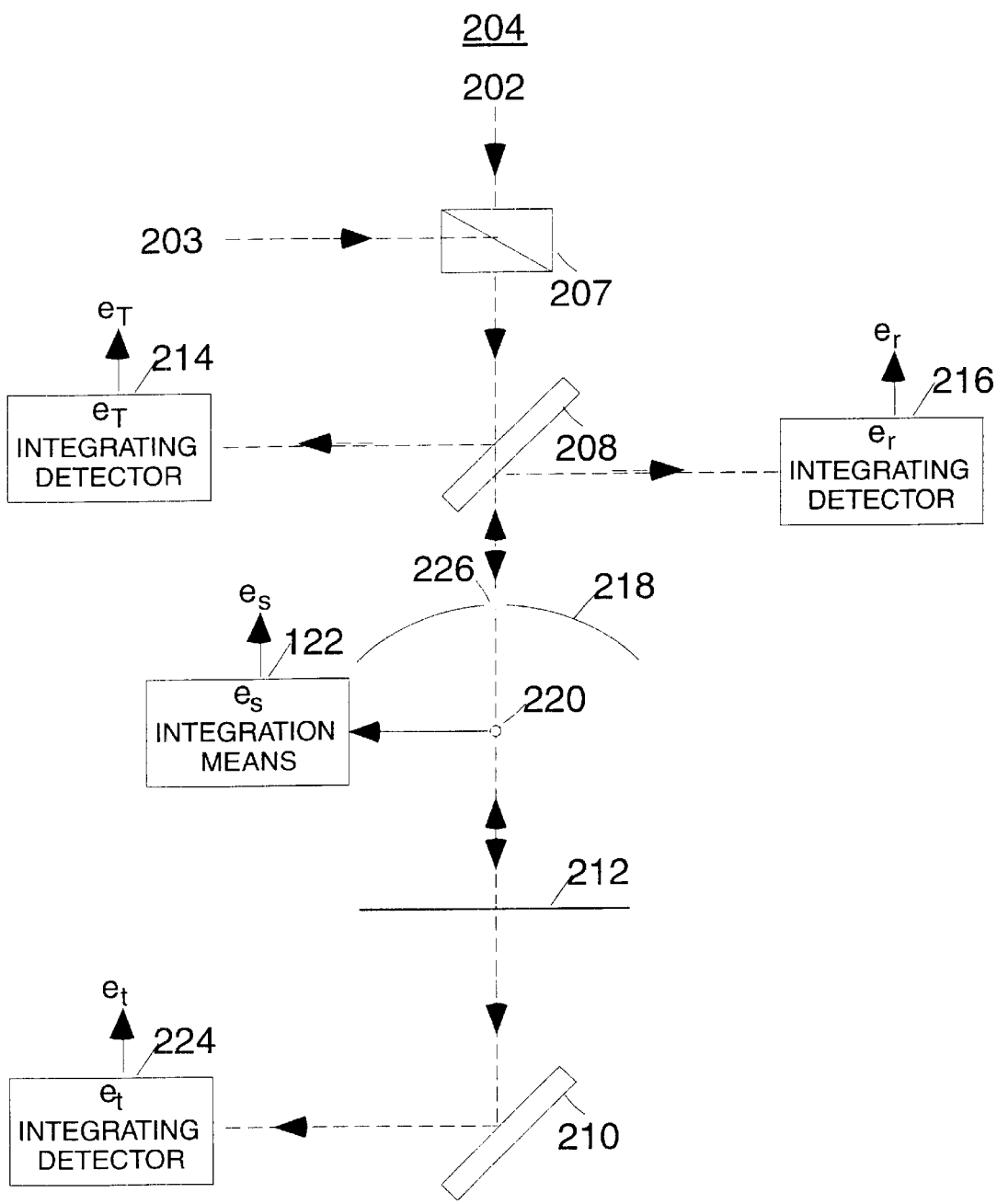
FIG. 2a is a schematic diagram of the multiple physical-energy measurement means of FIG. 2.

Reference is now made to FIG. 2a, which schematically shows the structure of multiple physical-energy measurement means 204 in more detail. This structure comprises beam-splitting prisms 207, partially-reflecting mirror 208, mirror 210, wafer 212, $e_T$ integrating detector 214, $e_r$ integrating detector 216, scattered-radiation reflector dome 218 having opening 226 therein, radiation-to-electric transducer 220, $e_s$ integrating means 222 and $e_t$ integrating detector 224. As indicated in FIG. 2a, radiation from pulsed laser 202 is applied to the upper surface of the upper prism of beam-splitting prisms 207, while radiation from probe laser 203 is applied to the left surface of the lower prism of beam-splitting prisms 207.

As known in the art, the upper and lower prisms of beam-splitting prisms 207 have different effective relative indices of refraction such that (1) substantially all of the radiation from probe laser 203 is totally reflected at the diagonal contiguous surfaces of the upper and lower prisms and (2) substantially all of the radiation from pulsed laser 202 is transmitted from the upper prism through the diagonal contiguous surfaces to the lower prism. A partially-reflecting mirror surface also comprises a beam splitter that could be used instead of beam-splitting prisms 207 for forwarding radiation from either pulsed laser 202 or probe laser 203 toward wafer 212. However, the use of a partially-reflecting mirror surface as a beam splitter would result in most of the radiation from probe laser 203 being lost. Therefore, the use of beam-splitting prisms 207 is preferred over the use of a beam splitter comprising a partially-reflecting mirror surface.

The elements 208, 210, 212, 214, 216, 218, 220 222, 224 and 226 of FIG. 2a correspond, respectively, in structure and function to those of above-described elements 108, 110, 112, 114, 116, 118, 120 122, 124 and 126 of FIG. 1a.

In addition to the above-described functions performed by the preferred embodiment of the present invention shown in FIGS. 1 and 1a or the alternative embodiment of the present invention shown in FIGS. 2 and 2a, the present invention may also perform one or more auxiliary functions. For instance, while the value of that portion of any radiated high-power LTP pulse from the pulsed-laser which is incident on the wafer has been determined by the immediately preceding low-power probe operation, it still may be desirable to record the value of the reflected energy $e_r$ during the occurrence of the high-power LTP pulse for each successively-flooded IC die being operated on. Such a recording makes it possible to compare the respective values of reflected energies $e_r$ from successively-flooded IC die to IC die.

It is known in the art that suitably-filtered flash lamps are available that are capable of emitting radiation that spectrally corresponds substantially to the radiation emitted by a given pulsed laser (e.g., the illustrative 308 nm XeCl pulsed laser). However, the radiation power emitted by such a flash lamp is low relative to the radiation power from the given pulsed laser emitting a high-power LTP pulse. Nevertheless, a flash lamp may be substituted for a pulsed laser as the illumination means to provide substantially equivalent emitted LTP energy by providing a significantly longer duration for a flash from the flash lamp than for a pulse from the given pulsed laser. Thus, depending on its brilliance, the duration of a flash from the flash lamp may be in a range extending from less than 1 millisecond (ms) to up to 1 second, while the pulse from the given pulsed laser may be a small fraction of a microsecond (e.g., a duration of 20 ns in the case of the illustrative 308 nm XeCl pulsed laser).

An important benefit of the above-described laser fluence regulation system, in the fabrication of many shallow-junction ICs on a silicon wafer, is that the entire system is located in-situ while illumination thermal processing (preferably, LTP) is taking place.

What is claimed is:

1. Apparatus comprising:

a radiation source to flood a given surface area of a silicon wafer with a measured total value, $e_T$, of radiation energy that is insufficient to damage or significantly heat said silicon wafer;

a measurement system to measure the value of the fraction, $e_r$, of said flooding radiation energy that is specularly reflected from said given surface area, the value of any non-negligible fraction, $e_s$, of said flooding radiation energy which is scattered by said given surface area and the value of any non-negligible fraction, $e_t$, of said flooding radiation energy which is transmitted through said wafer; and a computer to derive an output indicative of the value, $e_a$, of the fraction of said radiation energy flooding said given surface area which is absorbed by said silicon wafer in accordance with the equation $e_a = e_T - (e_r + e_s + e_t)$.

2. The apparatus defined in claim 1, wherein said apparatus is employed in the thermal-processing fabrication of a shallow-junction of an integrated-circuit (IC) occupying said given surface area on said silicon wafer and said wafer comprises crystalline silicon having an overlying surface layer of amorphized silicon covered by radiation-absorbent material; wherein said radiation energy flooding said given surface area has given spectral characteristics; and wherein said apparatus further comprises:

an illumination source having spectral characteristics similar to said given spectral characteristics and an adjustable fluence for flooding said given surface area with radiation energy substantially higher than the flooding radiation energy from said radiation source; and a controller responsive to said output from said computer to regulate said adjustable fluence of said illumination source in accordance with the value $e_a$ for a certain time duration which results in said illumination source emitting a second value of flooding radiation energy therefrom which is at least sufficient to cause said amorphized silicon to be melted by the fraction of the flooding radiation energy absorbed thereby and insufficient to cause either melting of said crystalline silicon or ablation of said radiation-absorbent material.

3. The apparatus defined in claim 2, wherein:

said illumination source comprises an adjustable-power pulsed laser that emits a fixed duration pulse of radiation to flood said given surface area;

said controller comprises a pulsed-laser radiated power controller that is operated in accordance with said output from said computer; and said computer comprises a data processor to derive the value of $e_a$.

4. The apparatus defined in claim 3, wherein:

said radiation source utilizes said pulsed-laser radiated power controller, wherein said pulsed-laser radiated power controller is selectively operated to lower the power of said pulsed laser to flood said given surface area of a silicon wafer with said measured value $e_T$ of radiation energy in accordance with said output from said data processor prior to full power operation of said pulsed laser;

whereby said pulsed-laser radiated power controller, said adjustable-power pulsed laser, said measurement system and said data processor form a closed loop system.

5. The apparatus defined in claim 4, wherein said measurement system comprises:

an $e_T$ integrating detector;

an $e_r$ integrating detector; and a partially-reflecting mirror including (1) a first partially-reflecting surface to transmit a major portion of pulsed-laser radiation incident thereon therethrough to flood said given surface area and reflecting a minor portion of said incident pulsed-laser radiation to an input of said $e_T$ integrating detector to provide an output therefrom corresponding to said measured value $e_T$, and (2) a second partially-reflecting surface to reflect the radiation specularly reflected from said given surface area that is incident thereon to an input of said $e_r$ integrating detector to provide an output therefrom corresponding to said measured value $e_r$.

6. The apparatus defined in claim 5, wherein said measurement system further comprises:

a radiation-to-electric transducer a scattered-radiation reflector dome having an opening therein, which opening is situated to permit both said transmitted major portion of radiation flooding said given surface area and said radiation specularly reflected from said given surface area pass therethrough, wherein said dome is positioned to intercept radiation scattered from said given surface area and then focus said intercept radiation reflected therefrom on said radiation-to-electric transducer; and an integrator responsive to an electric output from said radiation-to-electric transducer to provide an output therefrom corresponding to said measured value $e_s$.

7. The apparatus defined in claim 5, wherein said measurement system further comprises:

an $e_t$ integrating detector; and a mirror positioned to direct any radiation flooding said given surface area that has been transmitted through said wafer and that impinges upon a surface of said mirror to an input of said $e_t$ integrating detector to provide an output therefrom corresponding to said measured value $e_t$.

8. The apparatus defined in claim 3, wherein said pulsed laser comprises an XeCl excimer pulsed laser for emitting a 20 ns pulse of radiant energy at a wavelength of 308 nm.

9. The apparatus defined in claim 3, wherein:

said radiation source comprises a probe laser emitting radiation having said given spectral characteristics to flood said given surface area of said silicon wafer with said measured value $e_T$ of radiation energy prior to said pulsed laser flooding said given surface area with said fixed duration pulse of radiation;

whereby said probe laser, said measurement system, said data processor, said pulsed-laser radiated power controller and said adjustable-power pulsed laser form an open loop system.

10. The apparatus defined in claim 9, wherein said probe laser comprises a neodymium YAG laser.

11. The apparatus defined in claim 9, wherein said radiation source comprises a beam splitter positioned to effect the forwarding as an output therefrom of either said emitted radiation from said probe laser or said emitted radiation pulse from said pulsed laser to flood said given area.

12. The apparatus defined in claim 10, wherein said beam splitter comprises two optical prisms having contiguous diagonal surfaces, wherein said two prisms have different effective relative indices of refraction arranged so that said beam splitter totally reflects said emitted radiation from said probe laser and transmits said emitted radiation from said pulsed laser therethrough.

13. The apparatus defined in claim 11, wherein said measurement system comprises:

an $e_T$ integrating detector;

an $e_r$ integrating detector; and a partially-reflecting mirror including (1) a first partially-reflecting surface to transmit a major portion of the radiation output from said beam splitter incident thereon therethrough to flood said given surface area and reflecting a minor portion of said incident pulsed-laser radiation to an input of said $e_T$ integrating detector to provide an output therefrom corresponding to said measured value $e_T$, and (2) a second partially-reflecting surface to reflect the radiation specularly reflected from said given surface area that is incident thereon to an input of said $e_r$ integrating detector to provide an output therefrom corresponding to said measured value $e_r$.

14. The apparatus defined in claim 13, wherein said measurement system further comprises:

a radiation-to-electric transducer;

a scattered-radiation reflector dome having an opening therein, which opening is situated to permit both said transmitted major portion of radiation flooding said given surface area and said radiation specularly reflected from said given surface area pass therethrough, wherein said dome is positioned to intercept radiation scattered from said given surface area and then focus said intercept radiation reflected therefrom on said radiation-to-electric transducer; and an integrator responsive to an electric output from said radiation-to-electric transducer to provide an output therefrom corresponding to said measured value $e_s$.

15. The apparatus defined in claim 13, wherein said measurement system further comprises:

an $e_t$ integrating detector; and a mirror positioned to direct any radiation flooding said given surface area that has been transmitted through said wafer and that impinges upon a surface of said mirror to an input of said $e_t$ integrating detector to provide an output therefrom corresponding to said measured value $e_t$.

16. A thermal-processing method for fabricating a shallow-junction of an integrated-circuit (IC) occupying a given surface area on a silicon wafer, wherein said wafer comprises crystalline silicon having an overlying surface layer of amorphized silicon covered by radiation-absorbent material and wherein said method comprises the steps of:

a. flooding said given surface area with radiation energy having given spectral characteristics which is insufficient to damage or significantly heat said silicon wafer;

b. measuring, respectively, the total value $e_T$ of said flooding radiation energy, the value of the fraction $e_r$ of said total flooding radiation energy which is specularly reflected from said given surface area, the value of any non-negligible fraction $e_s$ of said total flooding radiation energy which is scattered by said given surface area and the value of any non-negligible fraction $e_t$ of said flooding radiation energy which is transmitted through said wafer;

c. determining the value of the fraction $e_a$ of said total flooding radiation energy which is absorbed by said radiation-absorbent material wafer in accordance with the equation $e_a = e_T - (e_r + e_s + e_t)$; and d. thereafter employing for a given time duration the value of the fraction $e_a$ to adjust the fluence value of an illumination source, that has spectral characteristics similar to said given spectral characteristics and emits second radiation energy flooding said given surface area, to a fluence value sufficiently high to result in said second radiation energy effecting the melting of said amorphized silicon but not high enough to result in said second radiation energy effecting either the melting of said crystalline silicon or the ablation of said radiation-absorbent material.

17. The thermal-processing method defined in claim 16 for successively fabricating the shallow-junction of each of a plurality of ICs occupying separate given surface areas on said silicon wafer, said method further comprising the step of:

e. repeating steps a., b. c. and d. for the fabrication of the shallow-junction of each one of said plurality of ICs being successively fabricated.

* * * * *